3,746,761
ADAMANTANOPYRIMIDINE COMPOUNDS AND INTERMEDIATES THEREFOR
Jiban Kumar Chakrabarti, Frimley, and Stephen Slomo Szinai, Workingham, England, assignors to Eli Lilly and Company, Indianapolis, Ind.
No Drawing. Original application May 1, 1969, Ser. No. 821,063, now Patent No. 3,644,356. Divided and this application Apr. 5, 1971, Ser. No. 131,439
Int. Cl. C07c *61/36*
U.S. Cl. 260—544 L                             2 Claims

ABSTRACT OF THE DISCLOSURE

Adamantanopyrimidine compounds of the formulae:

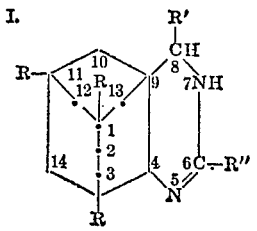 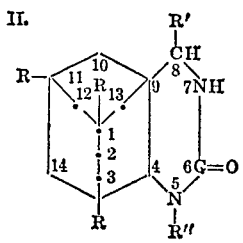

useful as analgesics and as local anaesthetics; and intermediates useful in the synthesis of the foregoing adamantanopyrimidine compounds.

CROSS REFERENCE TO RELATED APPLICATION

This application is a divisional application of our copending application Ser. No. 821,063, filed May 1, 1969 now U.S. Pat. 3,644,356.

SUMMARY OF THE INVENTION

The present invention is concerned with the preparation of certain adamantanopyrimidine compounds and with intermediates useful in their synthesis. The adamantanopyrimidine compounds, the ultimate products of the present invention, are of the formulae

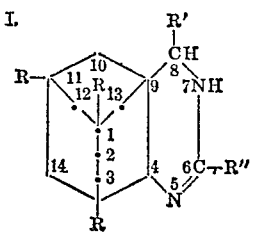 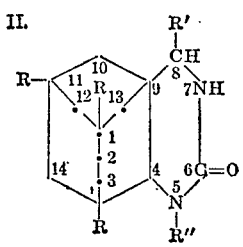

The intermediates are of the formulae:

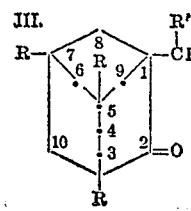 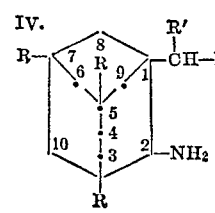

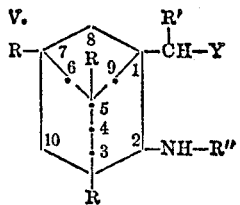

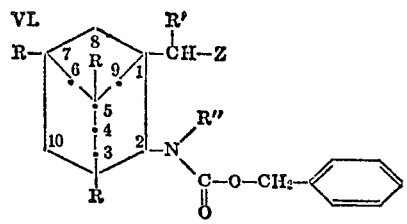

In the above and succeeding formulae, (1) each R represents hydrogen or $C_1$–$C_3$ loweralkyl, the sum of the number of carbon atoms in all three R groups being not greater than 6;
(2) each R' independently represents hydrogen or straight-chain $C_1$–$C_6$ alkyl;
(3) each R'' independently represents hydrogen or $C_1$–$C_3$ loweralkyl;
(4) X represents

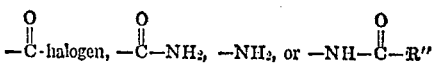

and
(5) Y represents

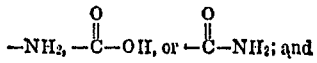

(6) Z represents

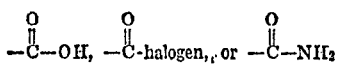

The subject matter of the present invention can more readily be understood by reference to the following summary reaction scheme. In this reaction scheme, as generally herein, the symbol "Ad<" is employed to designate a 1,2-divalent adamantyl radical of the formula

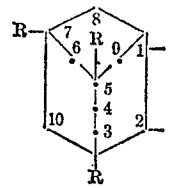

and the symbol "Ad≤," to designate a 1,2,2-trivalent adamantyl radical of the formula

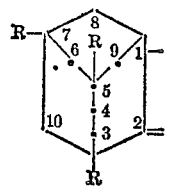

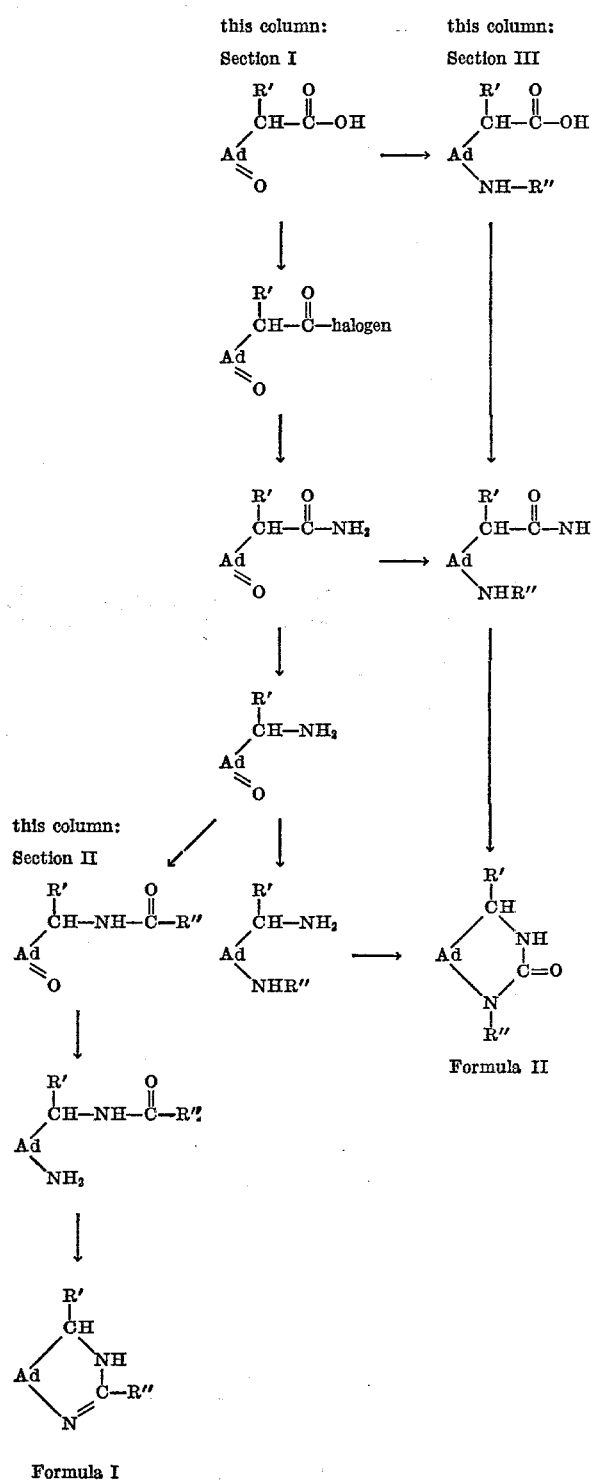

Formula I

DETAILED DESCRIPTION OF THE INVENTION

Throughout the present invention, compounds are named in accordance with standard chemical nomenclature. Thus, those compounds in which the adamantane ring is the only cyclic unit are named as substituted adamantanes, e.g., 2-amino-1-adamantaneacetic acid. Those compounds in which the adamantane ring is fused to the pyrimidine ring are named as tetracyclic compounds. For example, the compound of Formula II in which all R, R', and R" symbols designate hydrogen:

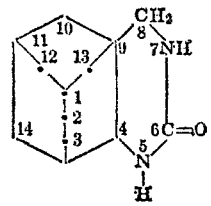

is named 5,7-diazatetracyclo(7.3.1.1$^{3,11}$.0$^{4,9}$)tetradecan-6-one.

As is evident from the summary reaction scheme hereinabove, the present invention is concerned ultimately with the preparation of compounds which can be described generically as adamantanopyrimidine compounds, the compounds of Formulae I and II. However, for the purpose of the following discussion, the various reactions are sub-divided into sections I, II, and III, as indicated hereinabove in the summary reaction scheme.

SECTION I

In accordance with this section, a 2-keto-1-adamantaneacetic acid:

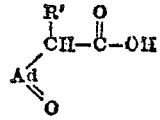

is converted to the corresponding acyl halide:

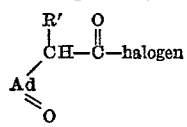

The conversion can be accomplished in any of the known procedures for conversion of an acid to an acyl halide. Most typically, the acid is reacted with a phosphorus halide, preferably, thionyl halide. Excess reagent or typical solvents, such as the hydrocarbons, can be used as an inert liquid reaction medium; the reaction goes forward at temperatures over a wide range, such as from room temperature or below to 100° C. or higher. Work-up is carried out in conventional procedures.

The resulting acyl halide is then converted to the corresponding amide:

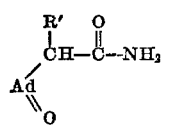

in known procedures for conversion of acids to amides. Thus, the acid is reacted with ammonia, in the form of aqueous ammonia or as gaseous dry ammonia. Hoffmann degradation of the resulting amide yields the corresponding amine:

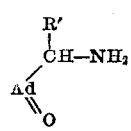

The keto group of this amine compound is then reductively aminated by reaction with an amine of the formula

NH$_2$R"

to obtain the corresponding 2-amino-1-adamantanemethylamine:

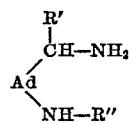

Reductive amination is accomplished in accordance with procedures well known in the prior art for this reaction.

Thus in the foregoing procedure are prepared all of the intermediates of Section I.

SECTION II

In accordance with Section II, various procedures are utilized to obtain the ultimate products of the present invention which are of Formula I.

Initially, a 2-keto-1-adamantanemethylamine

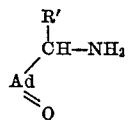

prepared as discussed in Section I, is acylated by reaction with an acyl halide of the formula

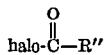

to yield the corresponding 2-keto-N-acyl-1-adamantane-methylamine:

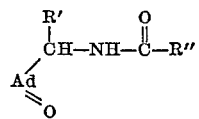

This intermediate, in turn, is reductively aminated with ammonia, affording the corresponding 2-amino-N-acyl-1-adamantanemethylamine:

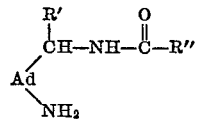

This intermediate is then cyclized to obtain the ultimate products of the present invention which are of Formula I:

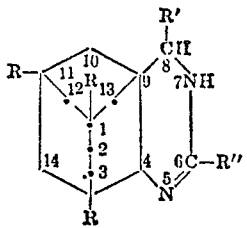

Cyclization can be effected by treatment with a base.

Thus, in this method are prepared the various intermediates involved in Section II, as well as the ultimate products of Formula I.

SECTION III

In accordance with Section III, various procedures are utilized to obtain the ultimate products which are of Formula II.

These ultimate products of Formula II are prepared by either of two separate synthetic routes.

In a first synthetic route the 2-keto-1-adamantaneacetic acid referred to in Section I:

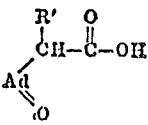

is reductively aminated by an amine of the formula $NH_2-R''$ to obtain the corresponding 2-amino-1-adamantaneacetic acid:

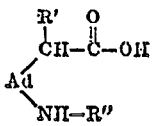

The amine moiety thereof is protected, such as by reaction with benzyl chloroformate, and the acid group of the resulting compound

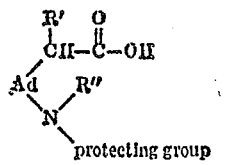

converted to the acyl chloride and then aminated with ammonia and the amino protecting group removed. As a result of these operations, there is obtained the corresponding 2-amino-1-adamantaneacetamide:

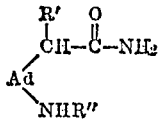

Alternately, this compound can be prepared by reductive amination of 2-keto-1-adamantaneacetamide, which compound is described hereinabove in Section I. Regardless of the method by which it is prepared, the 2-amino-1-adamantaneacetamide is then cyclized to the ultimate product of the present invention, of Formula II:

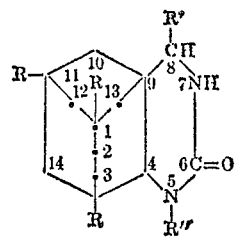

Cyclization is effected by subjecting the 2-amino-1-adamantaneacetamide to Hoffmann rearrangement conditions.

Thus in the manners described foregoing are prepared all of the ultimate products and intermediates of the present invention.

The ultimate products of the present invention which are of Formula I are readily reacted with acids in standard procedures to form corresponding acid addition salts. Particularly suited for the practice of the present invention are pharmaceutically acceptable acid addition salts. Such salts include the chloride, bromide, iodide, sulfate, bisulfate, acetate, salicylate, valerate, laurate, benzoate, phosphate, and the like.

The following examples illustrate the present invention and will enable those skilled in the art to practice the same.

EXAMPLE 1

2-keto-1-adamantaneacetyl chloride 2-keto-1-adamantaneacetic acid (5.0 grams; 0.024 mole) was dissolved in thionyl chloride (25 ml.) and the solution was heated under reflux for 1 hour. Excess thionyl chloride was removed under vacuum and the residue was dissolved in dry benzene and again evaporated under vacuum to obtain the desired 2-keto-1-adamantaneacetyl chloride as a residue.

EXAMPLE 2

2-keto-1-adamantaneacetamide

The 2-keto-1-adamantaneacetyl chloride obtained as reported in Example 1 was dissolved in dry ether (50 ml.) and ammonia was passed into the stirred solution for 1 hour at room temperature. After removal of the ether the residue was partitioned between water (50 ml.) and chloroform (50 ml.) and the aqueous phase was extracted with two further 50 ml. portions of chloroform. The combined chloroform extract was washed with 10 percent w./v. sodium carbonate solution (50 ml.), then with two 50 ml. portions of water, dried over magnesium sulfate and evaporated to give the expected 2-keto-1-adamantaneacetamide product as a pale solid (yield ca. 80 percent). It was crystallized from acetone/n-hexane to give a purified product as the monohydrate (2.68 grams, 68 percent), M.P. 120–125° C.

Calcd. for $C_{12}H_{17}NO_2 \cdot H_2O$ (percent): C, 64.10; H, 8.45; N, 6.24. Found (percent): C, 64.70; H, 8.67; N, 6.20.

EXAMPLE 3

2-amino-1-adamantaneacetamide

A solution of 2-keto-1-adamantaneacetamide monohydrate prepared as reported in Example 2 (0.96 gram; 0.0046 mole) in ethanol (50 ml.) was heated to reflux and refluxed for 30 minutes while ammonia gas was passed into the solution; the solution was then cooled to room temperature and saturated with ammonia. After standing overnight the solution was hydrogenated over 10 percent palladium on carbon for 24 hours at room temperature and 35 lb./sq. in. pressure and for a further 6 hours at around 60° C. and 60 lb./sq. in. The catalyst was filtered off, and the filtrate was evaporated to dryness under vacuum. A solution of the residue in chloroform (10 ml.) was extracted with two 10 ml. portions of dilute hydrochloric acid. The bulked extract was basified and re-extracted with two 10 ml. portions of chlorform and the chloroform extract was dried over magnesium sulfate and evaporated to give the desired 2-amino-1-adamantane-acetamide as a white solid (0.39 gram; 40 percent). It was crystallized from chloroform-light petroleum; the product so obtained was shown by melting point, mixed melting point and infrared spectrum procedures to be identical with a sample prepared from 2-amino-1-adamantaneacetic acid (Examples 10, 11, and 12 hereinbelow).

EXAMPLE 4

5,7-diazatetracyclo(7.3.1.1$^{3,22}$.0$^{4,9}$)tetradecan-6-one 2-amino-1-adamantaneacetamide (3.3 grams; 0.0158 mole) was added in small portions to a stirred solution of bromine (0.95 ml., 0.019 mole) in 10 percent w./v. sodium hydroxide (40 ml.) at 0–5° C. After stirring for 1 hour at 0–5° C., and 1 hour at 70–80° C., the solid was filtered off, washed with water (20 ml.), dilute HCl (20 ml.) and water (20 ml.) again and crystallized from dimethylformamide to give 5,7-diazatetracyclo(7.3.1.1$^{3,11}$·0$^{4,9}$)-tetradecan-6-one (1.83 grams; 56 percent), M.P. 310–320° (dec.).

Calcd. for $C_{12}H_{18}N_2O$ (percent): C, 69.86; H, 8.80; N, 13.58. Found (percent): C, 69.50; H, 8.84; N, 13.49.

EXAMPLE 5

2-keto-1-adamantanemethylamine 2-keto-1-adamantaneacetamide prepared as described in Example 2 (2.07 grams; 0.010 mole) was added in small portions to a stirred solution of bromine (0.6 ml., 0.012 mole) in 12 percent w./v. sodium hydroxide (20 ml.) at 0° C. The mixture was stirred for 1½ hours at 0° C., then 30 minutes at 70–80° C., cooled and extracted with ether (three 20-milliliter portions). The extract was washed with (10 ml.), dried over magnesium sulfate, and treated with ethanolic hydrochloric acid. The precipitate was crystallized from ethanol-ether to give 2-keto-1-adamantanemethylamine as the hydrochloride (1.2 grams; 56 percent), M.P. 214–220° C.

Calcd. for $C_{11}H_{17}NO \cdot HCl$ (percent): C, 61.25; H, 8.41; N, 6.50. Found (percent): C, 60.85; H, 8.33; N, 6.64.

EXAMPLE 6

2-amino-1-adamantanemethylamine

Ammonia was passed into a refluxing solution of 2-keto-1-adamantanemethylamine hydrochloride (0.43 gram; 0.002 mole), prepared as reported in Example 5, in ethanol (25 ml.) for 30 minutes. After cooling and saturating with ammonia the solution was hydrogenated at room temperature and atmospheric pressure over 10 percent palladium on carbon (0.1 gram) for 4 hours. The catalyst was filtered off and the filtrate was concentrated under vacuum, acidified with ethanolic HCl and diluted with ether to give 2-amino-1-adamantanemethylamine as the dihydrochloride (0.16 gram; 32 percent), M.P. 300–310° C. (dec.).

Calcd. for $C_{11}H_{20}N_2 \cdot 2HCl$ (percent): C, 52.18; H, 8.76; N, 11.06. Found (percent): C, 52.10; H, 8.62; N, 10.60.

EXAMPLE 7

2-keto-N-acetyl-1-adamantanemethylamine 2-keto-1-adamantanemethylamine hydrochloride (0.50 gram; 0.0023 mole), prepared as described in Example 5, was dissolved in water (5 ml.), and the solution was basified and extracted with chloroform (two 5-milliliter portions). After drying over calcium sulfate, the extract was treated with acetic anhydride (3 ml.) and heated under reflux for 1 hour, then evaporated to dryness. The solid residue was washed with water and crystallized from chloroform-light petroleum to give 2-keto-N-acetyl-1-adamantanemethylamine (0.31 gram; 61 percent), M.P. 122–124° C.

Calcd. for $C_{13}H_{19}NO_2$ (percent): C, 70.55; H, 8.66; N, 6.33. Found (percent): C, 70.60; H, 9.10; N, 6.25.

EXAMPLE 8

1-(acetamidomethyl)-2-aminoadamantane

An ethanolic solution of the 2-keto-N-acetyl-1-adamantanemethylamine prepared as reported in Example 7 was subjected to reductive amination with ammonia and hydrogen over 10 percent palladium on carbon at about 60 p.s.i. to give 2-amino-N-acetyl-1-adamantanemethylamine, which upon dehydration yields 6-methyl-5,7-diazatetracyclo(7.3.1.1$^{3,11}$.0$^{4,9}$)tetradec-5-ene.

EXAMPLE 9

2-methylamino-1-adamantaneacetic acid

A solution of 2-keto-1-admantaneacetic acid (6.24 grams; 0.030 mole) in a 33 percent w./v. solution of methylamine in ethanol (150 ml.) was hydrogenated at atmospheric pressure over 10 percent palladium on charcoal (0.5 gram) for 6 hours. After removal of the catalyst the filtrate was evaporated and the residue crystallized from ethanol-ether to give 2-metyhlamino-1-admantane-acetic acid (6.8 grams; 100 percent), M.P. 143–144° C.

Calcd. for $C_{13}H_{21}NO_2$ (percent): C, 69.92; H, 9.48; N, 6.27. Found (percent): C, 70.40; H, 9.49; N, 6.55.

EXAMPLE 10

2-(benzyloxycarbonylamino)-1-adamantaneacetic acid

Benzyl chloroformate (4.1 grams; 0.024 mole) was added dropwise to a stirred, ice-cold solution of 2-amino-1-adamantaneacetic acid hemihydrate (4.1 grams; 0.021 mole) in 2 N sodium hydroxide (10 ml.), maintaining the pH at about 10–11 by addition of further 2 N sodium hydroxide (10 ml.). After stirring for a further 40 minutes at 0–5° C., the reaction mixture was washed with ether (20 ml.), acidified with concentrated hydrochloric acid and extracted with ethyl acetate (three 25-milliliter portions). The extract was washed with water (10 ml.), dried over magnesium sulfate, and evaporated to give, on addition of light petroleum, 2-(benzyloxycarbonylamino)-1-adamantaneacetic acid (5.8 grams; 85 percent), M.P. 134–135° C., recrystallized from acetone-hexane, M.P. 136–138° C.

Calcd. for $C_{20}H_{25}NO_4$ (percent): C, 69.95; H, 7.34; N, 4.08. Found (percent): C, 70.25; H, 7.46; N, 4.17.

EXAMPLE 11

2-(benzyloxycarbonylamino)-1-admantaneacetamide

To a stirred ice-cold solution of 2-(benzyloxycarbonyl-amino)-1-adamantaneacetic acid (5.75 grams; 0.0168 mole) and triethylamine (2.44 ml., 0.0175 mole) in dry toluene (100 ml.) was added dropwise a solution of ethyl chloroformate (1.67 ml., 0.0175 mole) in dry toluene (10 ml.). After stirring for 1 hour at 0° C., the white solid was filtered off, ammonia was passed into the filtrate for 1 hour, and the mixture was kept for 16 hours at room temperature. The solvent was removed under vacuum and a solution of the residue in ethyl acetate (200 ml.) was washed successively with 5 percent w./v. sodium carbonate (100 ml.) dilute hydrochloric acid (100 ml.), and water (50 ml.) and crystallized by concentration and addition of light petroleum to give 2-(benzyloxycarbonylamino)-1-adamantaneacetamide (4.3 grams; 75 percent), M.P. 160–163° C., recrystallized from acetone-hexane, M.P. 166–168° C.

Calcd. for $C_{20}H_{26}N_2O_5$ (percent): C, 70.15; H, 7.65; N, 8.18. Found (percent): C, 70.80; H, 7.53; N, 8.15.

EXAMPLE 12

2-amino-1-adamantaneacetamide

A solution of 2-(benzyloxycarbonylamino) - 1 - adamantaneacetamide (5.4 grams; 0.0158 mole) in ethanol (150 ml.) was hydrogenated at room temperature and 30 lb./sq. in. pressure over 10 percent palladium on carbon (1.0 gram) for 1 hour. The catalyst was filtered off and the filtrate evaporated to give 2-amino-1-adamantaneacetamide (3.4 grams; 100 percent), M.P. 138–140° C., recrystallized from chloroform-light petroleum, M.P. 156–158° C.

Calcd. for $C_{12}H_{20}N_2O$ (percent): C, 69.19; H, 9.68; N, 13.45. Found (percent): C, 69.10; H, 9.64; N, 13.20.

EXAMPLE 13

5,7-diazatetracyclo$(7.3.1.1^{3,11}.0^{4,9})$tetradecan-6-one 2-amino-1-adamantaneacetamide, obtained as reported in Example 12, was reacted in the same manner as described in Example 4 to obtain 5,7-diazatetracyclo $(7.3.1.1^{3,11}.0^{4,9})$tetradecan-6-one.

Other compounds representative of the present invention and prepared in accordance with the foregoing teachings and examples include the following.

EXAMPLES 14–17

$\alpha$,3,5,7-tetramethyl-2-keto-1-adamantaneacetic acid is converted to $\alpha$,3,5,7-tetramethyl-2-keto - 1 - adamantaneacetyl chloride, which in turn is converted to $\alpha$,3,5,7-tetramethyl-2-keto-1-adamantaneacetamide. Hoffmann degradation of this last named compound yields $\alpha$,3,5,7-tetramethyl-2-keto-1-adamantanemethylamine which is reductively aminated with ammonia to yield $\alpha$,3,5,7-tetramethyl-2-amino-1-adamantanemethylamine.

EXAMPLES 18–21

$\alpha$-n-Hexyl - 5-isopropyl-2-keto-1-adamantaneacetic acid is converted to $\alpha$-n-hexyl - 5-isopropyl-2-keto-1-adamantaneacetyl bromide, which in turn is converted to $\alpha$-n-hexyl - 5-isopropyl-2-keto-1-adamantaneacetamide. Hoffmann degradation of this last named compound yields $\alpha$-n-hexyl - 5 - isopropyl - 2-keto-1-adamantanemethylamine which is reductively aminated with methylamine to yield $\alpha$-n-hexyl-5-isopropyl-2-methylamino-1-adamantanemethylamine.

EXAMPLES 22–25

3,5 - di-n-propyl-2-keto-1-admantaneacetic acid is converted to 3,5-di-n-propyl-2-keto-1-adamantaneacetyl chloride, which in turn is converted to 3,5-di-n-propyl-2-keto-1 - adamantaneacetamide. Hoffmann degradation of this last named compound yields 3,5 - di-n-propyl - 2-keto-1-adamantanemethylamine which is reductively aminated with isopropylamine to yield 3,5-di-n-propyl-2-(isopropylamino)-1-adamantanemethylamine.

EXAMPLES 26–29

$\alpha$-n-Propyl-3,5,7-triethyl-2-keto-1-adamantaneacetic acid is converted to $\alpha$-n-propyl - 3,5,7-triethyl-2-keto-1-adamantaneacetyl chloride, which in turn is converted to $\alpha$-n-propyl-3,5,7-triethyl-2-keto-1-adamantaneacetamide. Hoffmann degradation of this last named compound yields $\alpha$-n-propyl - 3,5,7-triethyl-2-keto-1-adamantanemethylamine which is reductively aminated with ethylamine to yield $\alpha$-n-propyl - 3,5,7-triethyl-2-(ethylamino)-1-adamantanemethylamine.

EXAMPLES 30–32

$\alpha$,3,5,7 - tetramethyl-2-keto-1-adamantanemethylamine is acylated by reaction with acetic anhydride to yield $\alpha$, 3,5,7 - tetramethyl-2-keto-N-acetyl-1-admanantanemethylamine which in turn is reductively aminated with ammonia to obtain $\alpha$,3,5,7-tetramethyl - 2 - amino-N-acetyl-1-adamantanemethylamine. Cyclization of this last named compound yields 1,3,6,8,11 - pentamethyl-5,7-diazatetracyclo-$(7.3.1.1^{3,11}.0^{4,9})$tetradec-5-ene.

EXAMPLES 33–35

$\alpha$-n-Hexyl-5-isopropyl-2-keto-1-adamantanemethylamine is acylated by reaction with propionic anhydride to yield $\alpha$-n-hexyl - 5-isopropyl-2-keto-N-propionyl-1-adamantanemethylamine which in turn is reductively aminated with ammonia to obtain $\alpha$-n-hexyl-5-isopropyl-2-amino-N-propionyl-1-adamantanemethylamine. Cyclization of this last named compound yields 8-n-hexyl-1-isopropyl-6-ethyl-5, 71diazatetracyclo$(7.3.1.1^{3,114}.0^{,9})$tetradec-5-ene.

EXAMPLES 36–38

3,5 - di-n-propyl - 2-keto-1-adamantanemethylamino is acylated by reaction with butyric anhydride to yield 3,5-di-n-propyl - 2-keto-N-butyryl-1-adamantanemethylamine which in turn is reductively aminated with ammonia to obtain 3,5 - di-n-propyl-2-amino-N-butyryl-1-adamantanemethylamine. Cyclization of this last named compound yields 3,6,11 - tri-n-propyl-5,7-diazatetracyclo$(7.3.1.1^{3,11}.0^{4,9})$tetradec-5-ene.

EXAMPLES 39–41

$\alpha$-n-Propyl - 3,5,7-triethyl-2-keto-1-adamantanemethylamine is acylated by reaction with acetic anhydride to yield $\alpha$-n-propyl - 3,5,7-triethyl-2-keto-N-acetyl-1-adamantanemethylamine, which in turn is reductively aminated with ammonia to obtain $\alpha$-n-propyl-3,5,7-triethyl-2-amino-N-acetyl - 1-adamantanemethylamine. Cyclization of this last named compound yields 8-n-propyl-1,3,11-triethyl-6-methyl-5,7-diazatetracyclo$(7.3.1.1^{3,11}.0^{4,9})$tetradec-5-ene.

EXAMPLES 42–43

$\alpha$,3,5,7 - tetramethyl-2-keto-1-adamantaneacetamide is reductively aminated by reaction with n-propylamine to yield $\alpha$,3,5,7 - tetramethyl-2-(n-propylamino)-1-adamantaneacetamide, which under Hoffman rearrangement conditions cyclizes to 1,3,8,11 - tetramethyl-5-n-propyl-5,7-diazatetracyclo$(7.3.1.1^{3,11}.0^{4,9})$tetradecan-6-one.

EXAMPLES 44–46

$\alpha$-n-Hexyl - 5-isopropyl-2-keto-1-adamantaneacetic acid is reductively aminated by reaction with ammonia to yield $\alpha$-n-hexyl - 5-isopropyl-2-amino-1-adamantaneacetic acid, the amino group of which is protected by reaction with benzyl chloroformate. The amino-protected compound is then converted through the acetyl chloride to the amide and the amino-protecting group removed. As a result of these operations, there is obtained $\alpha$-n-hexyl-5-isopropyl-2-amino-1-adamantaneacetamide, which under Hoffman rearrangement cyclizes to 8-n-hexyl-1-isopropyl-5,7-diazatetracyclo$(7.3.1.1^{3,11}.0^{4,9})$tetradecan-6-one.

EXAMPLES 47–48

3,5-di-n-propyl-2-keto-1-adamantaneacetamide is reductively aminated by reaction with ammonia to yield 3,5-di-n-propyl-2-amino-1-adamantaneacetamide, which under Hoffman rearrangement conditions cyclizes to 1,3-di-n-propyl - 5,7 - diazatetracyclo$(7.3.1.1^{3,11}.0^{4,9})$tetradecan-6-one.

EXAMPLES 49–51

α-n-Propyl-3,5,7-triethyl-2-keto-1-adamantaneacetic acid reductively aminated by reaction with methylamine to yield α-n-propyl - 3,5,7-triethyl-2-(methylamino3-1-adamantaneacetic acid, the amino group of which is protected by reaction with benzyl chloroformate. The amino-protected compound is then converted through the acetyl halide to the amide and the amino-protecting group removed. As a result of these operations, there is obtained α-n-propyl-3,5,7-triethyl-2-(methylamino)-1-adamantaneacetamide, which under Hoffman degradation conditions cyclizes to 8 - n-propyl-1,3,11-triethyl-5-methyl-5,7-diazatetracyclo(7.3.1.1$^{3,11}$.0$^{4,9}$)tetradecan-6-one.

The ultimate products of the present invention, compounds of Formulas I and II, are useful as analgesics and as local anaesthetics in warm-blooded animals. The compounds can be administered in any of several routes, and can be formulated to facilitate administration, in liquid or solid formulations such as tablets, pills, capsules, granules, powders, oral solutions or suspensions, and the like. The exact concentration of the present compound or compounds in the formulation is not critical, it being necessary only that an appropriate dosage of the compound or compounds be supplied to the animal being treated. In general, activity is obtained at rates of from 1 to 200 mg./kg. or more, depending upon the particular compound chosen, particular animal administered to, mode of administration, and other factors. Such administration can be made on one occasion to relieve a particular situation, or can be made on several occasions over a given period of time, such as daily, to achieve a continuing therapeutic effect. In a representative evaluation, a group of 5 mice was dosed, intraperitoneally in a carboxymethylcellulose suspension and at a rate of 100 mg./kg. Thirty minutes later the mice were challenged with 0.5 percent acetic acid and observed for writhing normally resultant from such challenge. Four mice of the treated group were completely protected from writhing during the thirty minutes following administration. In a control group of 5 mice likewise challenged with 0.5 percent acetic acid, all exhibited writhing, there being a total of 85 writhes in the first 15 minutes following challenge and a total of 50 additional writhes in the next 15 minutes.

The starting materials to be employed in accordance with the present invention:

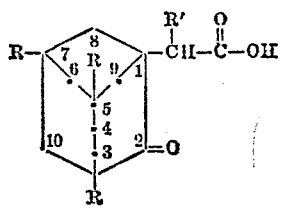

are prepared by oxidation of the corresponding 2-hydroxy-1-adamantaneethanol compounds:

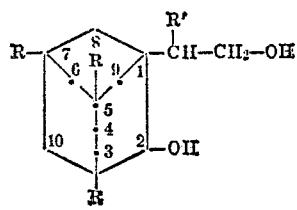

In a representative oxidation, a solution of potassium permanganate (4.2 grams; 0.027 mole) in 85 milliliters of water was added gradually to a well-stirred suspension of 2-hydroxy-1-adamantaneethanol (3.0 grams; 0.0143 mole) in 6.6 milliliters of a 10 percent aqueous solution of sodium hydroxide. After the addition which was carried out at room temperature, a deep green color persisted, and another solution of potassium permanganate (4.2 grams; 0.027 mole, in 85 milliliters of water) was added gradually. Thereafter, the reaction mixture was heated mildly on a steambath for about 3 hours, after which it was permitted to cool and held overnight at room temperature. The reaction mixture was then filtered from manganese dioxide and the precipitate washed with water. The combined filtrate and wash were extracted with ether. The aqueous layer was then acidified with dilute sulfuric acid, causing precipitation of the desired 2-keto-1-adamantaneacetic acid product. This product was extracted with ether, and the resulting ether solution washed with water, dried over magnesium sulfate, and the solution evaporated under subatmospheric pressure. The resulting product was crystallized from a mixture of ether and n-hexane to yield 2.5 grams of 2-keto-1-adamantaneacetic acid, M.P. 145–146° C.

*Analysis.*—Calcd. (percent): C, 69.21; H, 7.75. Found (percent): C, 69.47; H, 7.83.

The product was converted in standard procedures to its oxime, M.P. 153–155° C.

*Analysis.*—Calcd. (percent): C, 64.57; H, 7.65; N, 6.27. Found (percent): C, 65.10; H, 7.60; N, 6.10.

All of the 2-hydroxy-1-adamantaneethanol compounds are prepared in the same manner described for the preparation of 2-hydroxy-1-adamantaneethanol in pending U.S. application for Letters Patent Ser. No. 675,037, filed Oct. 13, 1967 now U.S. Pat. 3,591,642.

Thus, in these methods are prepared all of the starting materials to be used in accordance with the present invention. In respect to synthetic methods concerning the adamantane structure, attention is also directed to a review of adamantane chemistry located in Chemical Reviews, 1964, pages 277–300, inclusive.

We claim:
1. The compound of the formula

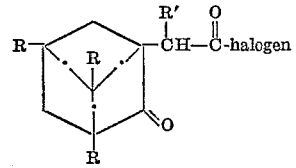

wherein
 (1) each R represents hydrogen or $C_1$–$C_3$ loweralkyl, the sum of the number of carbon atoms in all three R groups being not greater than 6; and
 (2) R' represents hydrogen or straight-chain $C_1$–$C_3$ alkyl.

2. The compound of claim 1 which is 2-keto-1-adamantaneacetyl chloride.

References Cited
UNITED STATES PATENTS

| | | | |
|---|---|---|---|
| 3,468,950 | 9/1969 | Chow et al. | 260—544 C X |
| 3,591,642 | 7/1971 | Szinai et al. | 260—544 C X |
| 3,644,356 | 2/1972 | Chakrabarti et al. | 260—544 C X |
| 3,654,301 | 4/1971 | Chakrabarti | 260—514 G X |

LORRAINE A. WEINBERGER, Primary Examiner

R. D. KELLY, Assistant Examiner